(12) United States Patent
Stegaru et al.

(10) Patent No.: US 8,424,010 B2
(45) Date of Patent: Apr. 16, 2013

(54) SHARED RESOURCE MANAGEMENT

(75) Inventors: Cristian Stegaru, Burnaby (CA); Radu Catalin Bocirnea, New Westminster (CA); Leonard Yan, Burnaby (CA)

(73) Assignee: McKesson Financial Holdings

( * ) Notice: Subject to any disclaimer, the term of this patent is extended or adjusted under 35 U.S.C. 154(b) by 522 days.

(21) Appl. No.: 12/690,962

(22) Filed: Jan. 21, 2010

(65) Prior Publication Data
US 2011/0179422 A1 Jul. 21, 2011

(51) Int. Cl.
*G06F 9/46* (2006.01)
(52) U.S. Cl.
USPC .......................................... 718/104; 718/106
(58) Field of Classification Search .................. None
See application file for complete search history.

(56) References Cited

U.S. PATENT DOCUMENTS

| | | | | |
|---|---|---|---|---|
| 6,105,098 A | * | 8/2000 | Ninose et al. | 710/200 |
| 6,601,083 B1 | * | 7/2003 | Reznak | 718/104 |
| 2008/0071997 A1 | * | 3/2008 | Loaiza et al. | 711/154 |

* cited by examiner

*Primary Examiner* — Kenneth Tang
(74) *Attorney, Agent, or Firm* — Alston & Bird LLP (57) ABSTRACT

Systems, methods, apparatus, and computer program products are provided for monitoring and allocating shared resources. For example, in one embodiment, the status of resource dependent entities is continuously monitored to determine the current use of a shared resource. When a resource dependent entity requires use of the shared resource, a (a) request for use of the shared resource can be generated and (b) determination can be made as to whether any of the current allocations of the shared resource can be released for use by the resource dependent entity.

9 Claims, 7 Drawing Sheets

SHARED RESOURCE MANAGEMENT

BACKGROUND

Systems have limited shared resources and can fail if shared resources are not reclaimed when no longer in use. Additionally, systems can accommodate more requests for shared resources than their nominal capacity by reclaiming, in certain conditions, shared resources that are still allocated but momentarily not in use and then re-allocating them. Thus, a need exists for monitoring and re-allocating shared resources.

BRIEF SUMMARY

In general, embodiments of the present invention provide systems, methods, apparatus, and computer program products for monitoring a shared resource.

According to one aspect, a computer-implemented method for monitoring a shared resource is provided. In one embodiment, the method comprises identifying a first resource dependent entity and a second resource dependent entity for monitoring, wherein each resource dependent entity (a) is associated with a resource dependent entity identifier, (b) uses the shared resource, and (c) is associated with a relationship status that identifies the resource dependent entity's use of the shard resource; monitoring the use of the shared resource by the first resource dependent entity and the second resource dependent entity; and in response to a change of use of the shared resource by the first resource dependent entity, generating a notification of the change of use. The method also comprises, in response to the notification of the change of use of the shared resource by the first resource dependent entity, updating the relationship status of the first resource dependent entity to reflect the change of use; receiving a request from the second resource dependent entity for use of the shared resource; and in response to receiving the request from the second resource dependent entity for use of the shared resource, determining the availability of the shared resource based at least in part on the first resource dependent entity's use of the shared resource.

In accordance with another aspect, a computer program product for monitoring a shared resource is provided. The computer program product may comprise at least one computer-readable storage medium having computer-readable program code portions stored therein, the computer-readable program code portions comprising executable portions configured to identify a first resource dependent entity and a second resource dependent entity for monitoring, wherein each resource dependent entity (a) is associated with a resource dependent entity identifier, (b) uses the shared resource, and (c) is associated with a relationship status that identifies the resource dependent entity's use of the shard resource; monitor the use of the shared resource by the first resource dependent entity and the second resource dependent entity; and in response to a change of use of the shared resource by the first resource dependent entity, generate a notification of the change of use. The computer-readable program code portions also comprise executable portions configured to, in response to the notification of the change of use of the shared resource by the first resource dependent entity, update the relationship status of the first resource dependent entity to reflect the change of use; receive a request from the second resource dependent entity for use of the shared resource; and in response to receiving the request from the second resource dependent entity for use of the shared resource, determine the availability of the shared resource based at least in part on the first resource dependent entity's use of the shared resource.

In accordance with yet another aspect, a system for monitoring a shared resource is provided. In one embodiment, the system comprises one or more memory storage areas and one or more processors configured to execute a resource monitor module, a shared resource manager module, and a resource broker module. The resource monitor module is configured for execution by the one or more processors to identify a first resource dependent entity and a second resource dependent entity for monitoring, wherein each resource dependent entity (a) is associated with a resource dependent entity identifier, (b) uses the shared resource, and (c) is associated with a relationship status that identifies the resource dependent entity's use of the shard resource; monitor the use of the shared resource by the first resource dependent entity and the second resource dependent entity; and in response to a change of use of the shared resource by the first resource dependent entity, generate a notification of the change of use. The first interface of the shared resource manager module is configured for execution by the one or more processors to receive the notification of the change of use of the shared resource by the first resource dependent entity; and in response to receiving the notification of the change of use of the shared resource by the first resource dependent entity, update the relationship status of the first resource dependent entity to reflect the change of use. The resource broker module is configured for execution by the one or more processors to receive a request from the second resource dependent entity for use of the shared resource; and forward the request from the second resource dependent entity for use of the shared resource to the shared resource manager module. And the second interface of the shared resource manager module is configured for execution by the one or more processors to receive the forwarded request for use of the shared resource; and in response to receiving the forwarded request for use of the shared resource, determine the availability of the shared resource based at least in part on the first resource dependent entity's use of the shared resource.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

Figure 1:
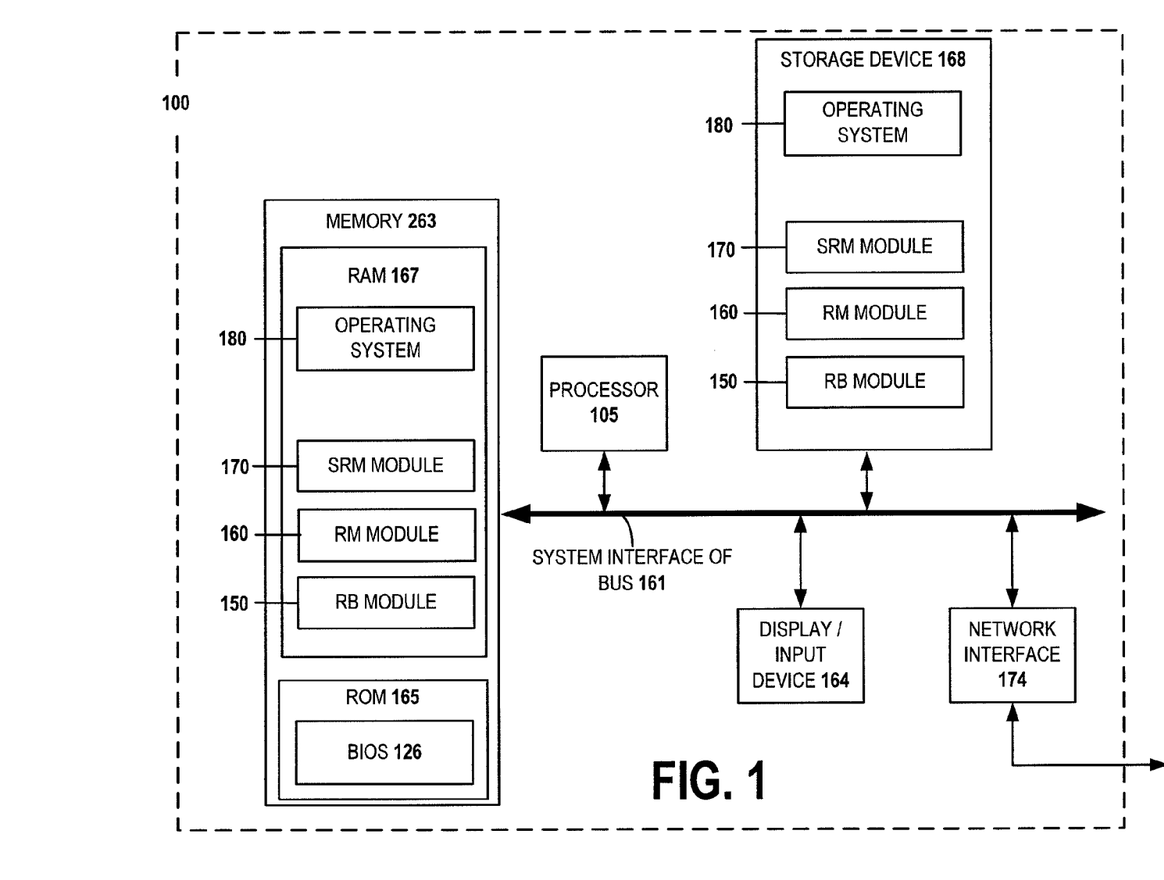
FIG. 1 is an exemplary schematic diagram of a management system according to one embodiment of the present invention.

FIG. 1 provides a schematic of a management system 100 according to one embodiment of the present invention. In general, the term "system" may refer to, for example, any computer, computing device, desktop, notebook or laptop, distributed system, server, gateway, switch, or other processing device adapted to perform the functions described herein. As will be understood from this figure, in this embodiment, the management system 100 includes a processor 105 that communicates with other elements within the scheduling system 100 via a system interface or bus 161. The processor 105 may be embodied in a number of different ways. For example, the processor 105 may be embodied as various processing means such as a processing element, a coprocessor, a controller or various other processing devices including integrated circuits such as, for example, an application specific integrated circuit ("ASIC"), a field programmable gate array ("FPGA"), a hardware accelerator, or the like.

In an exemplary embodiment, the processor 105 may be configured to execute instructions stored in the device memory or otherwise accessible to the processor 105. As such, whether configured by hardware or software methods, or by a combination thereof, the processor 105 may represent an entity capable of performing operations according to embodiments of the present invention while configured accordingly. A display device/input device 164 for receiving and displaying data is also included in the management system 100. This display device/input device 164 may be, for example, a keyboard or pointing device that is used in combination with a monitor. The management system 100 further includes memory 163, which may include both read only memory ("ROM") 165 and random access memory ("RAM") 167. The management system's ROM 165 may be used to store a basic input/output system ("BIOS") 126 containing the basic routines that help to transfer information to the different elements within the management system 100.

In addition, in one embodiment, the management system 100 includes at least one storage device 168, such as a hard disk drive, a CD drive, and/or an optical disk drive for storing information on various computer-readable media. The storage device(s) 168 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 168 may be connected to the system bus 161 by an appropriate interface.

Furthermore, a number of program modules may be stored by the various storage devices 168 and/or within RAM 167. Such program modules may include an operating system 180, shared resource manager ("SRM") module 170, a resource monitor ("RM") module 160, and a resource broker ("RB") module 150. These modules may control certain aspects of the operation of the management system 100 with the assistance of the processor 105 and operating system 180—although their functionality need not be modularized. In addition to the program modules, the management system 100 may store or be connected to one or more databases with one or more tables stored therein.

Also located within the management system 100, in one embodiment, is a network interface 174 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the management system 100 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the management system's 100 components may be located remotely from other management system 100 components. Furthermore, one or more of the components may be combined and additional components performing functions described herein may be included in the management system 100.

III. Exemplary System Operation

Figure 2:
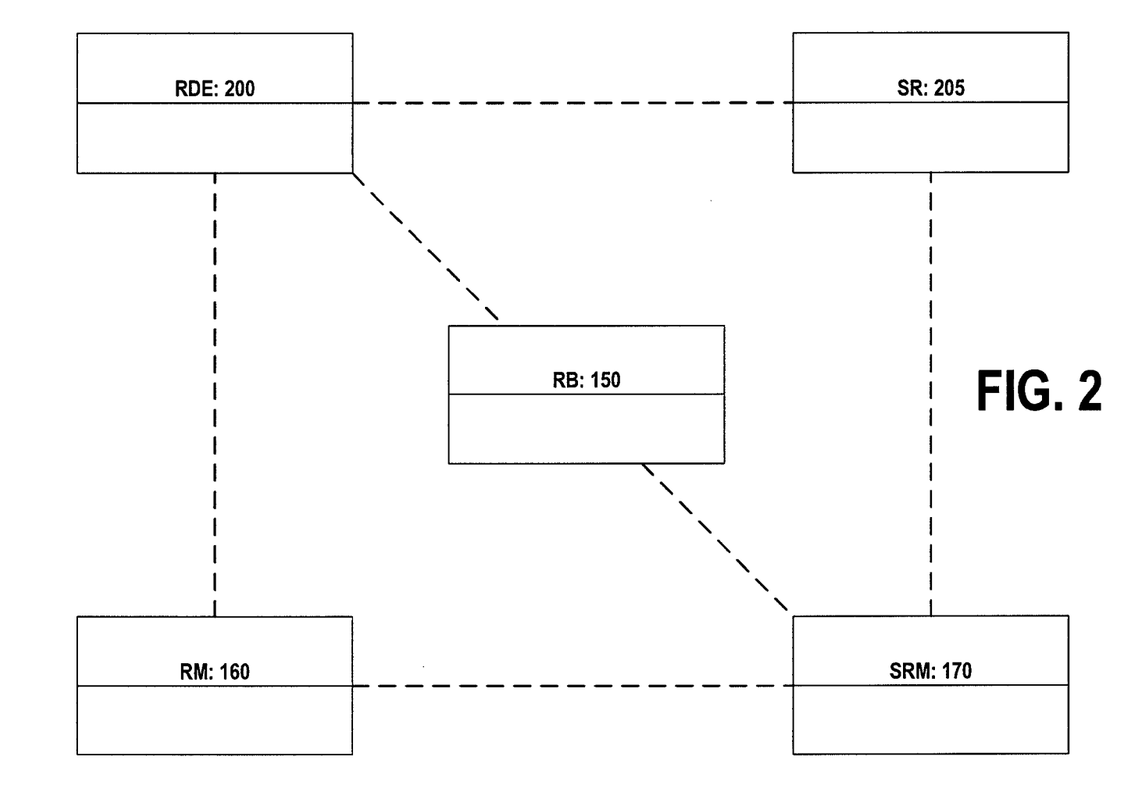
FIGS. 2-3 show exemplary entities of an exemplary management system that can be used to perform operations according to one embodiment of the present invention.
Figure 3:
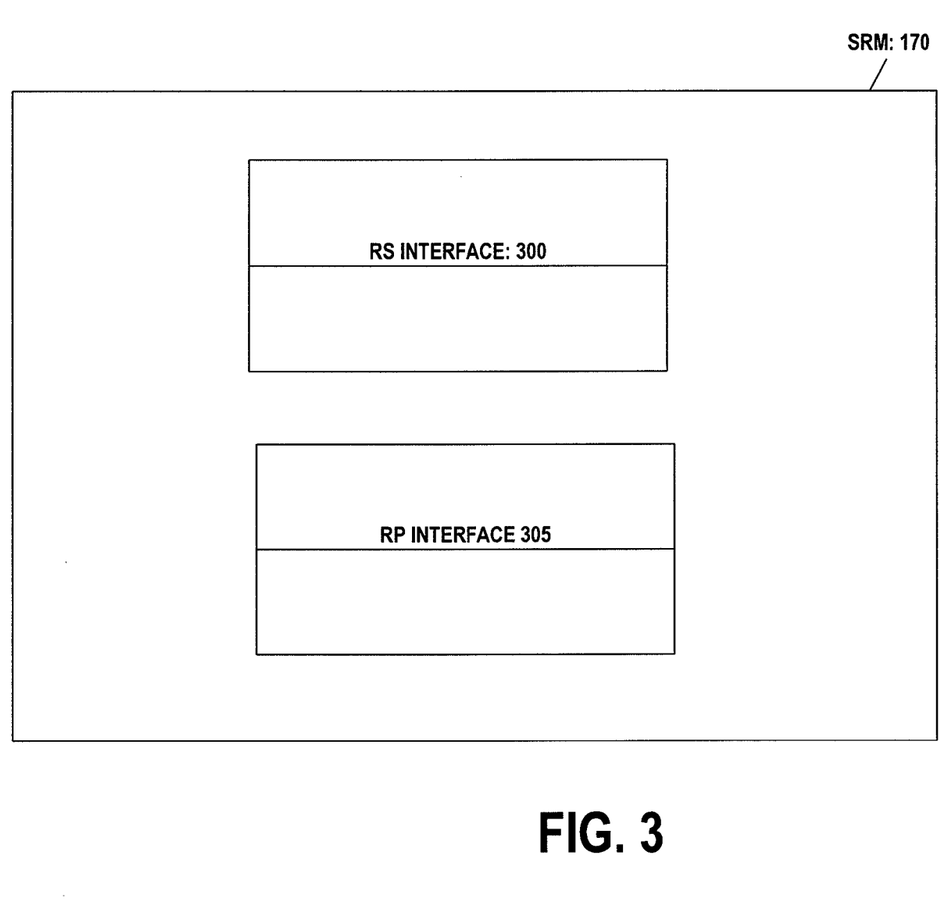

Reference will now be made to FIGS. 2-7. FIGS. 2-3 show exemplary entities of an exemplary management system 105 that can be used to perform operations according to one embodiment of the present invention. FIGS. 4-7 illustrate operations that may be performed to manage resources.

A. Resource Dependent Entity

As shown in FIG. 2, in one embodiment, the management system 100 monitors resource dependent entities ("RDEs") and the use of a shared resource by the various RDEs. An RDE may be, for example, an application, a thread, a process, an auxiliary entity, or any other entity that uses a shared resource. To aid in understanding embodiments of the present invention, a display protocol that includes multiple RDEs will be described. A display protocol is an application (executed, for example, by the management system 100) that includes a diagnostic flow (with automated and/or manual steps) to be performed in interpreting one or more volumes of images from, for instance, a radiology procedure. The display protocol may have multiple RDEs, with each RDE being, for example, a tool (e.g., window or viewport) for viewing an image from the one or more volume of images.

In one embodiment, a shared resource may be any of a variety of resources, such as memory or connections to a computing device or database. In continuing with the above example, a shared resource used by a display protocol may be memory used to create and store one or more volumes of images and/or different views of images. That is, a display protocol (and its corresponding RDEs), may require the use of memory to store volumes of images and/or different views of images for interpreting the images of a particular case type. For example, the volumes of images and different views of images may include (a) views along the original axis of image acquisition (e.g., axial to the patient's body), (b) multi-planar reconstruction views orthogonal to this axis (e.g., sagittal and coronal to the patient's body), and (c) specialty reconstructions such as volume rendering (a two-dimensional projection used to visualize volumes in an anatomically realistic manner). Thus, in the above example, the shared resource comprises memory used by RDEs (e.g., windows and viewports) of a display protocol to create and store volumes of images. It should be noted that embodiments of the present invention are not limited to any particular type of RDE or shared resource.

In one embodiment, the shared resource may be associated one or more shared resource identifiers. For example, a shared resource identifier may be a unique string that includes a "type" and an "id," such as <type>: <id>. Thus, a shared resource identifier may identify the type as a volume of images (e.g., <volume>) with a volume id of (e.g., <12345>).

In this example, the shared resource identifier is volume: 12345. Similar to the shared resource identifier, each RDE may be associated with a unique resource dependent entity identifier, such as "PID 32144." A variety of other approaches and techniques can be used with embodiments of the present invention.

In one embodiment, each RDE is associated with a relationship status. The relationship status may indicate an RDE's relationship to the shared resource. Illustrative relationship statuses include (a) strongly owned relationships, (b) weakly owned relationships, and (c) unowned relationships. For example, a particular RDE that is actively using the shared resource (e.g., a window or viewport in the display protocol that is currently causing display of an image to a user) may be associated with a strongly owned relationship status. The strongly owned relationship status indicates that the shared resource cannot be released for use by another RDE. Similarly, a particular RDE that is not actively using the shared resource (e.g., a window or viewport in the display protocol that is currently not causing display of an image to a user) may be associated with a weakly owned relationship status. The weakly owned relationship status indicates that the shared resource can be released for use by another RDE. And finally, an RDE that is not using the shared resource at all may be associated with an unowned relationship status. It should be noted that the relationship status of an RDE may change. For example, in the display protocol, the relationship status of each RDE may change as a user toggles or selects different windows or viewports to view different volumes or views of images. Thus, an RDE may be associated with different relationship statuses at different stages of the RDE's lifetime by implementing a state machine in which all of the states do not require use of the shared resource.

B. Resource Monitor Module ("RM")

Figure 4:
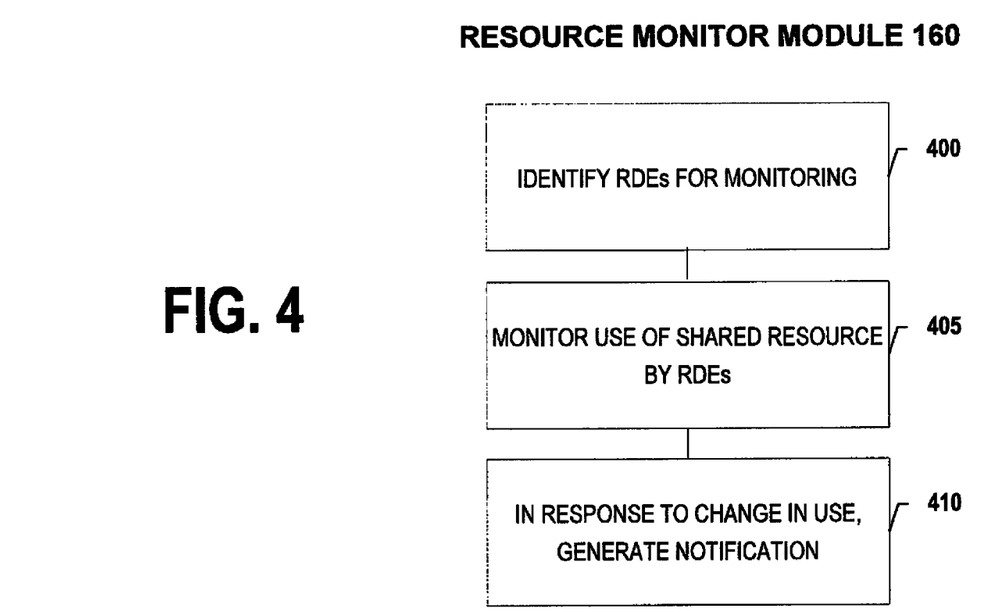
FIGS. 4-7 are flowcharts illustrating operations and processes that can be used in accordance with various embodiments of the present invention.

As shown in FIGS. 2 and 4, in one embodiment, a resource monitor module 160 ("RM 160") identifies one or more RDEs for monitoring and monitors the use of the shared resource by the various RDEs (Block 400). As indicated in Block 405, the RM 160 monitors RDEs and determines whether the shared resource used by the RDEs is being actively used (e.g., currently causing display of an image to a user) or passively used (e.g., currently not causing display of an image to a user). For instance, in continuing with the above example, the RM 160 (a) monitors the windows or viewports (e.g., RDEs) to determine when the windows or viewports are causing display of an image to a user and (a) associates a corresponding relationship status to each RDE. As shown in the below table, to make such determinations and associations, the RM 160 can subscribe to specific events associated with the RDE that may reflect changes in use of the shared resource by the RDE (e.g., changes in the use of memory by the viewports or windows).

--- public IEnumerable<string> VisibleVolumes { get; private set; }
public IEnumerable<string> NonVisibleVolumes { get; private set; }

---

By subscribing to the relevant RDEs, the RM 160 receives notifications from the RDEs that may indicate changes in their use of the shared resource, such as receiving notifications as to when the RDEs are causing display of images and when they are no longer causing display of the images. Thus, once the RM 160 subscribes to the relevant RDEs (e.g., windows or viewports), the RM 160 receives notifications of the events to which it subscribes. And because not all notifications represent the occurrence of actual events by the RDE, the RM 160 can determine if an actual change in use of the shared resource by the particular RDE actually occurred. For example, the RM 160 can determine if a window or viewport changed its status by either causing display of images to a user or no longer causing display of images to a user. In response to the RM 160 determining that an actual change in use of the shared resource by the RDE has actually occurred, the RM 160 updates the RDE relationship status to reflect the change in use. Additionally, the RM 160 can generate a notification to any entities interested (entities that are logically subscribed to or registered with the RM 160) in the change in use by the RDE (Block 410). This allows the RM 160 to provide current information to interested entities about the use of the shared resource by the various RDEs. In one embodiment, the RM 160 generates the notification to the shared resource manager module 170.

C. Resource Broker Module ("RB")

In one embodiment, as shown in the below table, the resource broker module 150 ("RB 150") coordinates requests for use of the shared resource from RDEs and, in response, returns promised allocations of the shared resource.

```
public interface IResourceBroker
{
    /// <summary>
    ///
    /// </summary>
    /// <param name="requestedResource"></param>
    /// <returns></returns>
    ResourcePromise RequestResource(SharedResource
requestedResource);
}
```

For example, in the event an RDE requires the use of a shared resource and the management system 100 determines that the allocation of the shared resource exceeds a threshold of the available shared resource (e.g., there is insufficient available memory or number of available connections), the RB 150 can be used to request use of the shared resource. In one embodiment, to perform this functionality, the RB 150 communicates with (a) RDEs and (b) a resource store interface 300 of the SRM 170. For example, the RB 150 communicates with RDEs and can receive requests for use of the shared resource (e.g., requests for use of memory by windows or viewports to create and store images). Similarly, the RB 150 can communicate with resource stores (e.g., a resource store interface 300 of a SRM 170) that can be used to (a) release the allocation of the shared resources from RDEs with, for example, weakly owned relationship statuses and (b) promise the allocation of the shared resource to the a RDE.

Figure 6:
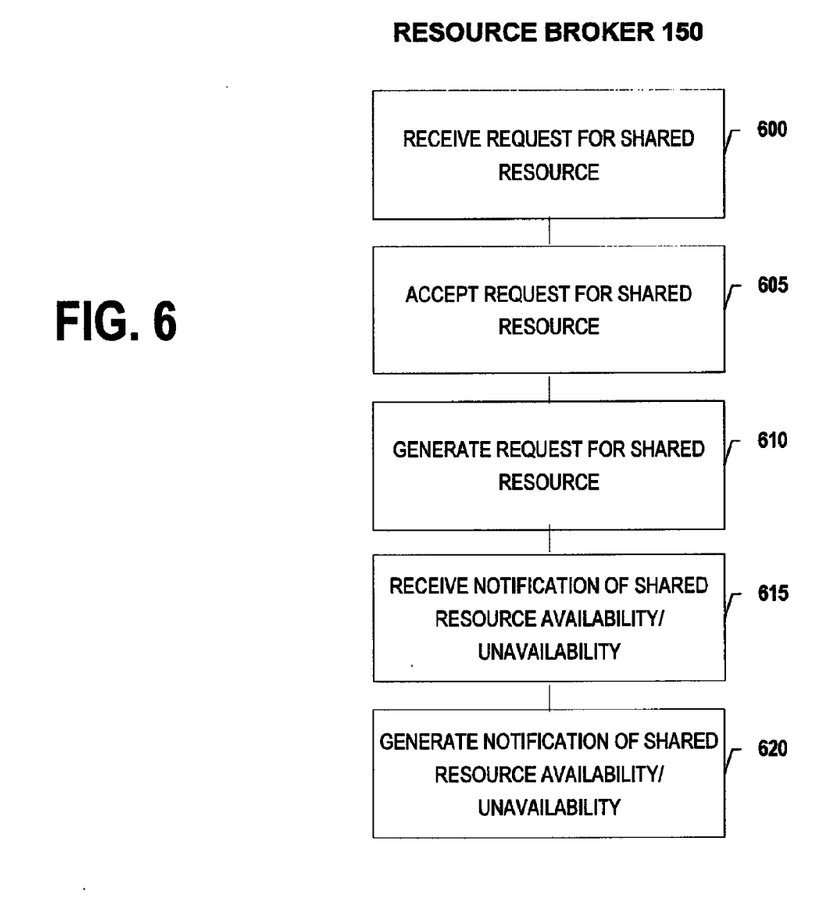

Operatively, in one embodiment shown in FIG. 6, the management system 100 receives a request from an RDE requesting use of shared resource. In the event the management system 100 determines that the available shared resource is insufficient to satisfy the RDE's request, the RDE can generate a request to the RB 150 for use of the shared resource. For example, in the event a window or viewport requests an allocation for memory to create and store images and the management system 100 determines that the available memory is insufficient, the window or viewport can generate a request to the RB 150 requesting use (e.g., a promised allocation) of the shared resource. In response to receiving and accepting the request from the window or viewport (e.g., RDE) for use of the shared resource (e.g., memory), the RB 150 can generate a similar request to the resource store interface 300 of the SRM 170 (Blocks 600, 605, 610). In response to the RB's 150 request to the resource store interface 300 of the SRM 170, the RB 150 receives a notification from the resource store interface 300 of the SRM 170. This notification indicates the availability or unavailability of the shared resource (Block 615). Accordingly, the RB 150 generates a similar notification to the requesting RDE indicating the availability or unavailability of the shared resource (Block 620).

D. Shared Resource Manager Module ("SRM")

As shown in FIG. 2, in one embodiment, the shared resource manager module 170 ("SRM 170") can be used to centralize management of the shared resource. To centralize the management, the SRM 170 can implement multiple interfaces (FIG. 3), such as a resource store interface 300 ("RS interface 300") and a resource pool interface ("RP interface 305").

i. Resource Pool Interface ("RP Interface")

Figure 5:
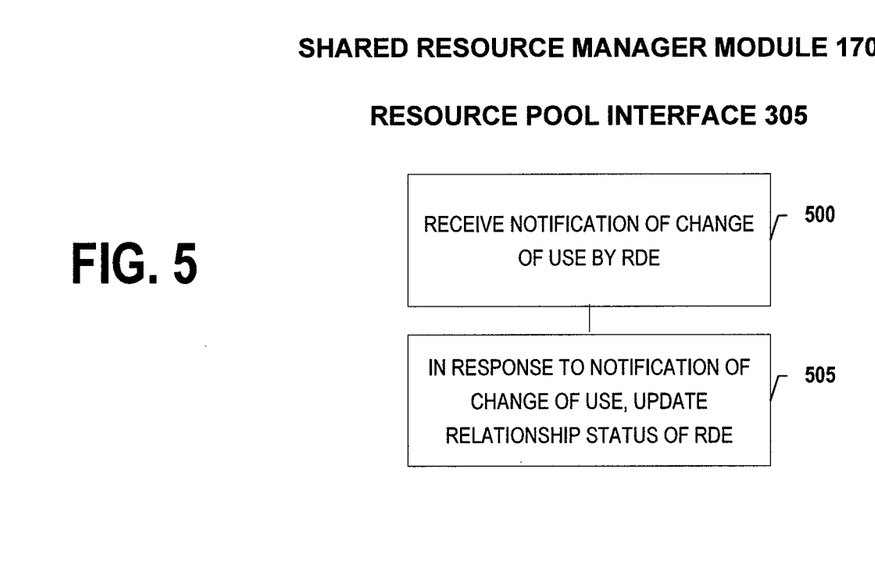

In one embodiment, the RP interface 305 is a configurable pool that stores the relationship status of relevant RDEs. For example, the RP interface 305 can logically subscribe to the RM 160 to receive notifications regarding the change in use of the shared resource by certain RDEs (Block 500). Upon receiving a notification of a change in use of the shared resource by an RDE, the RP interface 305 updates and stores the relationship status of the RDE (Block 505) as shown in the below table.

```
public interface IResourcePool
{
    /// <summary>
    /// Updates the relevance of resources
    /// </summary>
    /// <param name="pinnedResources"></param>
    /// <param name="otherResourcesInUse"></param>
    void UpdateResourceRelevance(IEnumerable<string>
pinnedResources, IEnumerable<string>
otherResourcesInUse);
}
```

For example, each time a window or viewport (a) causes display of an image to a user or (b) no longer causes display of an image to a user, the RM 160 can generate a notification to the RP interface 305. Upon receiving the notification, the RP interface 305 updates the RDE's relationship status to reflect the information included in the notification from the RM 160. Accordingly, for a given RDE, the RP interface 305 receives, stores, and provides information regarding the RDE's use of the shared resource.

ii. Resource Store Interface ("RS Interface")

In one embodiment, the RS interface 300 is a configurable store that can (a) determine the shared resources that are being used by RDEs (e.g., RDEs with a strongly owned relationship status), (b) determine the shared resources that can be released for use by another RDE (e.g., RDEs with a weakly owned relationship status), and (c) promise a specific allocation of the shared resource (e.g., based upon the available of the shared resource). For example, in the event an RDE requires the use of a shared resource and the management system 100 determines that the allocation of the shared resource exceeds a threshold of the available shared resource (e.g., available memory or number of connections), the RDE can generate a request to the RB 150 requesting use of the shared resource. Upon receipt, the RB 150 can then generate a similar request to the RS interface 300 of the SRM 170. In response to the request from the RB 150 and as shown in the below table, the RS interface 300 can (a) determine if any allocations of the shared resource can be released (e.g., by identifying RDEs associated with a weakly owned relationship status), (b) cause release of the allocation of the shared resource to those RDEs associated with a weakly owned relationship status, and (c) promise an allocation to the shared resource to the requesting RDE.

```
public interface IResourceStore
{
    /// <summary>
    /// return the amount of freed resources
    /// </summary>
    /// <param name="resourceAmount"></param>
    /// <returns></returns>
    long FreeAvailableResources(long
resourceAmount);
}
```

Operatively, in one embodiment, the request for the shared resource from the RB 150 is a request initially generated by an RDE, such as a window or viewport in the display protocol requesting the use of memory to create and store images. As discussed previously, the request from the RDE (e.g., window or viewport in the display protocol) may be in response to the management system 100 determining that the available shared resource (e.g., memory) is insufficient to satisfy the RDE's request. Thus, the RDE (e.g., window or viewport) generates a request to the RB 150 for the use of memory. When the RB 150 receives and accepts the request for use of the shared resource from the RDE, the RB 150 generates a similar request to the RS interface 300.

Figure 7:
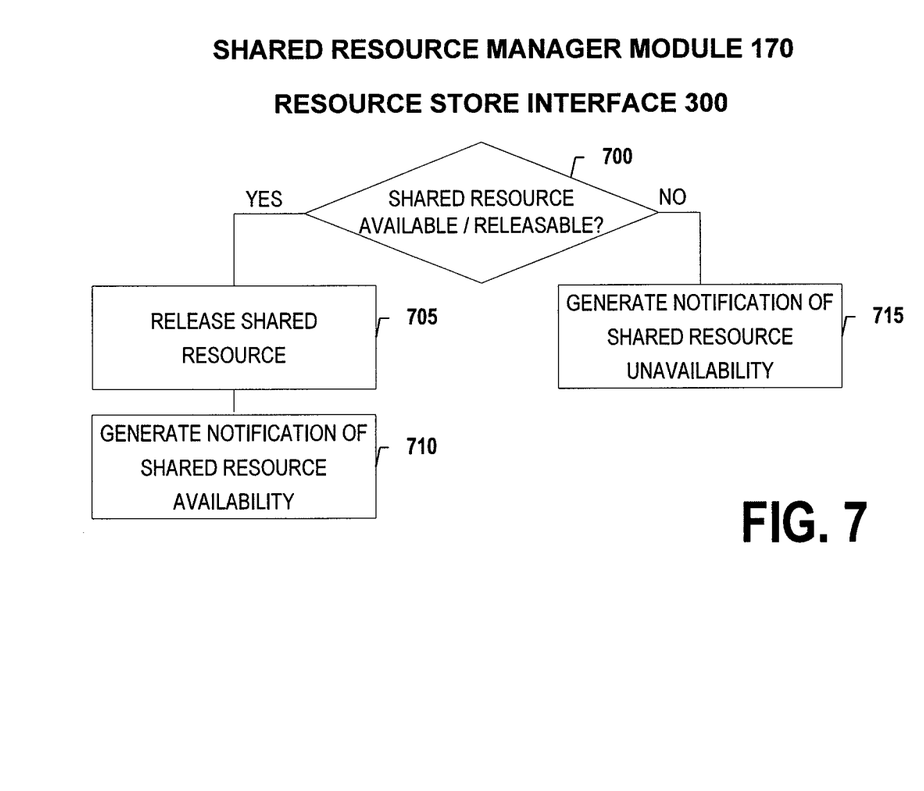

In response to receiving the request for the shared resource from the RB 150, the RS interface 300 determines the availability of the shared resource (Block 700). In particular, the RS interface 300 determines if any of the shared resource being used by RDEs can be released. For example, to perform this function, the RS interface 300 can access the information about the various RDEs that is received and stored by the RP interface 305 of the SRM 170, e.g., the relationship status of each RDE. With the information received and stored by the RP interface 305, the RS interface 300 can determine if any RDEs are associated with a weak relationship status (e.g., indicating that the corresponding windows or viewports are not causing display of their associated images). In response to determining that one or more RDEs are associated with a weak relationship status, the RS interface 300 can release the allocation of the shared resource from the corresponding RDEs (Block 705). That is, if the RS interface 300 determines that a window or viewport is not currently causing display of an image to a user (which is indicated by being associated with a weakly owned relationship status), the RS interface 300 can cause the release of memory (e.g., shared resource) allocated to that RDE. In one embodiment, this releases the memory (e.g., shared resource) for use by another RDE. In addition to releasing the allocation of the shared resource, the RS interface 300 can generate a notification to the RB 150 indicating the amount/quantity of the shared resource that was made available as a result of the release (Block 710). In response, the RB 150 receives this notification from the RS interface 300 and in turn generates a notification to the originally requesting RDE indicating the amount/quantity of the shared resource that was made available (Block 620).

In the event the RS interface 300 determines that one or more RDEs are not associated with a weak relationship status (e.g., all windows or viewports are causing display of images to a user), the RS interface 300 can generate a notification to the RB 150 indicating the unavailability of the shared resource (Block 715). In response, the RB 150 receives this notification from the RS interface 300 and in turn notifies the originally requesting RDE as to the unavailability of the shared resource (Block 620).

In various embodiments, the RS interface 300 can be configured to release shared resources in a variety of states with each of the states being associated with a common relationship status. In various embodiments, this improves the performance of the management system 100 as the operating system 180 will no longer need to page its working set to a disk. Similarly, the number of RDEs will not be affected by the size of the page file.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for monitoring a shared resource, the computer-implemented method comprising:

monitoring, via one or more processors, use of a shared resource by a first resource dependent entity, wherein the first resource dependent entity (a) is associated with a resource dependent entity identifier and (b) is associated with a relationship status that identifies the first resource dependent entity's use of the shared resource;

after a change in use of the shared resource by the first resource dependent entity, generating a notification of the change in use;

after receiving the notification of the change in use of the shared resource by the first resource dependent entity, updating the relationship status of the first resource dependent entity to reflect the change in use by the first resource dependent entity;

receiving, via the one or more processors, a request from a second resource dependent entity for use of the shared resource;

after receiving the request from the second resource dependent entity for use of the shared resource, determining whether the shared resource is available to satisfy the request of the second resource dependent entity, wherein the determination is based at least in part on the relationship status of the first resource dependent entity;

after a determination that the shared resource is not available to satisfy the request of the second resource dependent entity, determining whether at least a portion of the shared resource can be released from the first resource dependent entity to satisfy the request of the second resource dependent entity; and after a determination that the at least a portion of the shared resource can be released from the first resource dependent entity, causing release of the at least a portion of the shared resource from the first resource dependent entity and generating a notification indicating the availability of the shared resource for the second resource dependent entity;

wherein (a) the relationship status is selected from the group consisting of a strongly owned relationship, a weakly owned relationship, and an unowned relationship and (b) the relationship status changes during the lifetime of the first resource dependent entity; and wherein the first resource dependent entity's use of the shared resource is released prior to the termination of normal processing and allocated to the second resource dependent entity.

2. The computer-implemented method of claim 1, wherein determining whether the at least the portion of the shared resource can be released from the first resource dependent entity comprises determining whether the relationship status of the first resource dependent entity to the shared resource is associated with a weakly owned relationship status.

3. The computer-implemented method of claim 1, wherein the shared resource is selected from the group consisting of (a) one or more memory storage areas and (b) one or more connections to a computing entity.

4. A computer program product for monitoring a shared resource, the computer program product comprising at least one non-transitory computer-readable storage medium having computer-readable program code portions stored therein, the computer-readable program code portions comprising:
   an executable portion configured to monitor use of a shared resource by a first resource dependent entity, wherein the first resource dependent entity (a) is associated with a resource dependent entity identifier and (b) is associated with a relationship status that identifies the first resource dependent entity's use of the shared resource;
   an executable portion configured to, after a change in use of the shared resource by the first resource dependent entity, generate a notification of the change in use;
   an executable portion configured to, after receiving the notification of the change in use of the shared resource by the first resource dependent entity, update the relationship status of the first resource dependent entity to reflect the change in use by the first resource dependent entity;
   an executable portion configured to receive a request from a second resource dependent entity for use of the shared resource;
   an executable portion configured to, after receiving the request from the second resource dependent entity for use of the shared resource, determine whether the shared resource is available to satisfy the request of the second resource dependent entity, wherein the determination is based at least in part on the relationship status of the first resource dependent entity;
   an executable portion configured to, after a determination that the shared resource is not available to satisfy the request of the second resource dependent entity, determine whether at least a portion of the shared resource can be released from the first resource dependent entity to satisfy the request of the second resource dependent entity; and
   an executable portion configured to, after a determination that the at least a portion of the shared resource can be released from the first resource dependent entity, cause release of the at least a portion of the shared resource from the first resource dependent entity and generate a notification indicating the availability of the shared resource for the second resource dependent entity;
   wherein (a) the relationship status is selected from the group consisting of a strongly owned relationship, a weakly owned relationship, and an unowned relationship and (b) the relationship status changes during the lifetime of the first resource dependent entity; and
   wherein the first resource dependent entity's use of the shared resource is released prior to the termination of normal processing and allocated to the second resource dependent entity.

5. The computer program product of claim 4, wherein determining whether the at least the portion of the shared resource can be released from the first resource dependent entity comprises determining whether the relationship status of the first resource dependent entity to the shared resource is associated with a weakly owned relationship status.

6. The computer program product of claim 4, wherein the shared resource is selected from the group consisting of (a) one or more memory storage areas and (b) one or more connections to a computing entity.

7. An apparatus comprising at least one processor and at least one memory including computer program code, the at least one memory and the computer program code configured to, with the processor, cause the apparatus to at least:
   monitor use of a shared resource by a first resource dependent entity, wherein the first resource dependent entity (a) is associated with a resource dependent entity identifier and (b) is associated with a relationship status that identifies the first resource dependent entity's use of the shared resource;
   after a change in use of the shared resource by the first resource dependent entity, generate a notification of the change in use;
   after receiving the notification of the change in use of the shared resource by the first resource dependent entity, update the relationship status of the first resource dependent entity to reflect the change in use by the first resource dependent entity;
   receive a request from a second resource dependent entity for use of the shared resource;
   after receiving the request from the second resource dependent entity for use of the shared resource, determine whether the shared resource is available to satisfy the request of the second resource dependent entity, wherein the determination is based at least in part on the relationship status of the first resource dependent entity;
   after a determination that the shared resource is not available to satisfy the request of the second resource dependent entity, determine whether at least a portion of the shared resource can be released from the first resource dependent entity to satisfy the request of the second resource dependent entity; and
   after a determination that the at least a portion of the shared resource can be released from the first resource dependent entity, cause release of the at least a portion of the shared resource from the first resource dependent entity and generate a notification indicating the availability of the shared resource for the second resource dependent entity;
   wherein (a) the relationship status is selected from the group consisting of a strongly owned relationship, a weakly owned relationship, and an unowned relationship and (b) the relationship status changes during the lifetime of the first resource dependent entity; and
   wherein the first resource dependent entity's use of the shared resource is released prior to the termination of normal processing and allocated to the second resource dependent entity.

8. The apparatus of claim 7, wherein determining whether the at least the portion of the shared resource can be released from the first resource dependent entity comprises determining whether the relationship status of the first resource dependent entity to the shared resource is associated with a weakly owned relationship status.

9. The apparatus of claim 7, wherein the shared resource is selected from the group consisting of (a) one or more memory storage areas and (b) one or more connections to a computing entity.

* * * * *